United States Patent
Hong

(10) Patent No.: US 9,543,827 B2
(45) Date of Patent: Jan. 10, 2017

(54) INTERNAL VOLTAGE GENERATION CIRCUITS

(71) Applicant: SK hynix Inc., Icheon-si Gyeonggi-do (KR)

(72) Inventor: Yun Seok Hong, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 14/636,303

(22) Filed: Mar. 3, 2015

(65) Prior Publication Data

US 2016/0149485 A1 May 26, 2016

(30) Foreign Application Priority Data

Nov. 26, 2014 (KR) .................. 10-2014-0166073

(51) Int. Cl.
*G05F 1/10* (2006.01)
*H02M 3/07* (2006.01)

(52) U.S. Cl.
CPC ..................... *H02M 3/07* (2013.01)

(58) Field of Classification Search
CPC ......... G11C 5/145; G11C 5/147; G11C 16/30; H02M 3/07

See application file for complete search history.

(56) References Cited

U.S. PATENT DOCUMENTS

2006/0244514 A1* 11/2006 Lee ................ G11C 5/145
                                                    327/536
2013/0248687 A1   9/2013 Standley et al.

FOREIGN PATENT DOCUMENTS

KR    1020100003077 A    1/2010

* cited by examiner

*Primary Examiner* — Sibin Chen
(74) *Attorney, Agent, or Firm* — William Park & Associates Ltd.

(57) ABSTRACT

An internal voltage generation circuit may include a pump controller and an internal voltage generator. The pump controller suitable for generating a first control signal enabled if a level of an internal voltage signal is lower than a target voltage level and a second control signal enabled if a level of the internal voltage signal is lower than the target voltage level after a predetermined period elapses from a point of time that the internal voltage signal is pumped. The internal voltage generator suitable for pumping the internal voltage signal with a first drivability in response to the first control signal and suitable for pumping the internal voltage signal with a second drivability in response to the second control signal.

26 Claims, 7 Drawing Sheets

United States Patent US 9,543,827 B2

INTERNAL VOLTAGE GENERATION CIRCUITS

CROSS-REFERENCE TO RELATED APPLICATION

The present application claims priority under 35 U.S.C. 119(a) to Korean Application No. 10-2014-0166073, filed on Nov. 26, 2014, in the Korean Intellectual Property Office, which is incorporated herein by reference in its entirety as set forth in full.

BACKGROUND

1. Technical Field

Embodiments of the present disclosure generally relate to semiconductor integrated circuits and, more particularly, to internal voltage generation circuits.

2. Related Art

In general, semiconductor devices receive a power supply voltage VDD and a ground voltage VSS from an external system. The received power supply voltage VDD and ground voltage VSS are used to generate internal voltages used in operations of internal circuits of the semiconductor devices. The internal voltages for operating the internal circuits of the semiconductor devices may include a core voltage VCORE. The core voltage VCORE may be supplied to core regions of the semiconductor device. The internal voltages for operating the internal circuits of the semiconductor devices may include a high voltage VPP. The high voltage VPP may be used to drive or overdrive word lines of the semiconductor device. The internal voltages for operating the internal circuits of the semiconductor devices may include a low voltage VBB. The low voltage VBB may be applied to a bulk region (or a substrate) of NMOS transistors in the core region of the semiconductor device.

The core voltage VCORE may be a positive voltage lower than the power supply voltage VDD supplied from the external system. Thus, the core voltage VCORE may be generated by lowering the power supply voltage VDD to a certain level. In contrast, the high voltage VPP may be higher than the power supply voltage VDD. The low voltage VBB may be a negative voltage lower than the ground voltage VSS. Thus, charge pump circuits may be required to generate the high voltage VPP and the low voltage VBB.

SUMMARY

According to an embodiment, an internal voltage generation circuit may include pump controller and an internal voltage generator. The pump controller is suitable for generating a first control signal which is enabled if a level of an internal voltage signal is lower than a target voltage level and is suitable for generating a second control signal which is enabled if a level of the internal voltage signal is lower than the target voltage level even after a predetermined period elapses from a point of time that the internal voltage signal is pumped. The internal voltage generator is suitable for pumping the internal voltage signal with a first drivability in response to the first control signal and is suitable for pumping the internal voltage signal with a second drivability in response to the second control signal.

According to an embodiment, an internal voltage generation circuit may include a pulse detector suitable for generating a selection signal which is enabled if a level of an internal voltage signal is lower than a target voltage level after a predetermined period elapses from a point of time that an enablement signal is generated. The internal voltage generation circuit may include a control signal generator suitable for generating an oscillation signal including pulses that occur in response to the enablement signal and suitable for outputting the oscillation signal as a first control signal or a second control signal according to a level of the selection signal. The internal voltage generation circuit may include a first pump suitable for pumping the internal voltage signal with a first drivability in response to the first control signal. The internal voltage generation circuit may include a second pump suitable for pumping the internal voltage signal with a second drivability in response to the second control signal. The enablement signal may be enabled if a level of the internal voltage signal is lower than the target voltage level.

DETAILED DESCRIPTION OF THE EMBODIMENTS

Various embodiments of the present disclosure will be described hereinafter with reference to the accompanying drawings. However, the embodiments described herein are for illustrative purposes only and are not intended to limit the scope of the present disclosure.

Various embodiments may be directed to internal voltage generation circuits.

Figure 1:
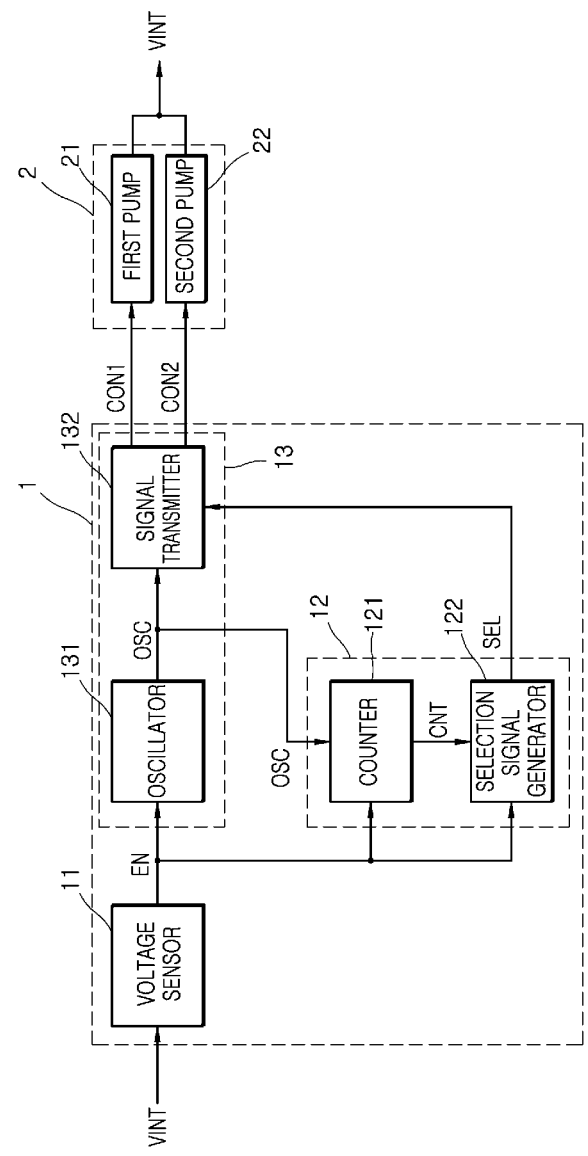
FIG. 1 is a block diagram illustrating an example of a representation of an internal voltage generation circuit according to an embodiment.

FIG. 1 is a block diagram illustrating an example of a representation of an internal voltage generation circuit according to an embodiment.

Referring to FIG. 1, the internal voltage generation circuit according to an embodiment may include a pump controller 1 and an internal voltage generator 2.

The pump controller 1 may be configured to include a voltage sensor 11, a pulse detector 12 and a control signal generator 13.

The voltage sensor 11 may sense a level of an internal voltage signal VINT to generate an enablement signal EN. The enablement signal EN may be enabled if a level of the internal voltage signal VINT is lower than a target voltage level. The enablement signal EN may be enabled if a level of the internal voltage signal VINT is lower than the target voltage level after a power-up period. The power-up period may correspond to a time period taken for a power supply voltage VDD to reach a predetermined voltage level (i.e., the target voltage level) after the power supply voltage VDD is applied to a semiconductor device.

The internal voltage signal VINT may be set to be a high voltage VPP having a voltage level higher than the power supply voltage VDD or a low voltage VBB having a voltage level lower than a ground voltage VSS according to the various embodiments.

The pulse detector 12 may include a counter 121 and a selection signal generator 122.

The counter 121 may generate a count signal CNT. The count signal may be enabled if pulses of an oscillation signal OSC are generated by a predetermined number of times while the enablement signal EN is enabled. A level of the count signal CNT generated from the counter 121 may be changed if the pulses of the oscillation signal OSC are inputted to the counter 121 by the predetermined number of times.

The selection signal generator 122 may generate a selection signal SEL. The selection signal SEL may be enabled if the count signal CNT is enabled while the enablement signal EN is enabled.

The pulse detector 12 may generate the selection signal SEL. The selection signal SEL may be enabled if a level of the internal voltage signal VINT is lower than the target voltage level after a predetermined period elapses from a point of time that the enablement signal EN is generated.

The control signal generator 13 may include an oscillator 131 and a signal transmitter 132.

The oscillator 131 may generate the oscillation signal OSC including pulses that periodically occur while the enablement signal EN is enabled.

The signal transmitter 132 may output the oscillation signal OSC as a first control signal CON1 if the selection signal SEL is disabled. The signal transmitter 132 may output the oscillation signal OSC as a second control signal CON2 if the selection signal SEL is enabled.

That is, the control signal generator 13 may generate the oscillation signal OSC including pulses that periodically occur while the enablement signal EN is enabled and may output the oscillation signal OSC as the first or second control signal CON1 or CON2 according to a level of the selection signal SEL.

The pump controller 1 including the aforementioned configuration may generate the first control signal CON1 enabled if a level of the internal voltage signal VINT is lower than the target voltage level and may generate the second control signal CON2 enabled if a level of the internal voltage signal VINT is lower than the target voltage level even after a predetermined period elapses from a point of time that the internal voltage signal VINT is pumped. The predetermined period may be set by the number of pulses of the first control signal CON1 for pumping the internal voltage signal VINT.

The internal voltage generator 2 may include a first pump 21 and a second pump 22.

The first pump 21 may pump the internal voltage signal VINT with a first drivability. The first pump 21 may pump the internal voltage signal VINT with a first drivability if the pulses of the first control signal CON1 are inputted thereto.

The first pump 22 may pump the internal voltage signal VINT with a second drivability. The first pump 22 may pump the internal voltage signal VINT with a second drivability if the pulses of the second control signal CON2 are inputted thereto.

The second drivability may be set to be higher than the first drivability.

The internal voltage generator 2 including the aforementioned configuration may pump the internal voltage signal VINT with the first drivability if the first control signal CON1 is enabled and may pump the internal voltage signal VINT with the second drivability if the second control signal CON2 is enabled.

In various embodiments, the first pump 21 may be realized using a doubler pump that has the first drivability to generate the internal voltage signal VINT having a voltage level that is twice a level of the power supply voltage VDD. The second pump 22 may be realized using a tripler pump that has the second drivability to generate the internal voltage signal VINT having a voltage level that is three times a level of the power supply voltage VDD. The first drivability of the first pump 21 may be set to be different according to the various embodiments, and the second drivability of the second pump 22 may also be set to be different according to the various embodiments.

Figure 2:
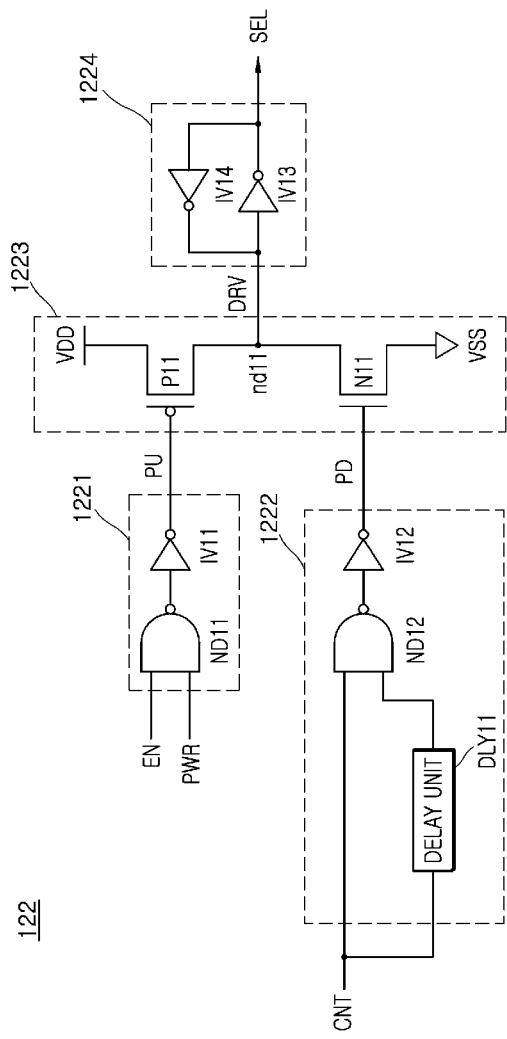
FIG. 2 is a circuit diagram illustrating an example of a representation of a selection signal generator included in a pulse detector of the internal voltage generation circuit illustrated in FIG. 1.

Referring to FIG. 2, the selection signal generator 122 may include a pull-up signal generator 1221, a pull-down signal generator 1222, a driver 1223 and a latch unit 1224.

The pull-up signal generator 1221 may include a NAND gate ND11 and an inverter IV11. The NAND gate ND11 and an inverter IV11 may be cascaded and may generate a pull-up signal PU. The pull-up signal PU may be enabled if at least one of the enablement signal EN and a power-up signal PWR is disabled. The power-up signal PWR may be enabled after the power-up period corresponding to a time period it takes the power supply voltage VDD to reach a predetermined voltage level (i.e., the target voltage level) from a point of time that the power supply voltage VDD is applied.

The pull-down signal generator 1222 may include a delay unit DLY11, a NAND gate ND12 and an inverter IV12 and may generate a pull-down signal PD including a pulse that occurs during a predetermined period from a point of time that the count signal CNT is enabled. The a pulse width of the pull-down signal PD may be set to a delay time of the delay unit DLY11, and the pull-down signal generator 1222 may be realized using a general pulse generation circuit.

The driver 1223 may be realized to include a PMOS transistor P11 and an NMOS transistor N11 connected or coupled in series between a power supply voltage VDD terminal and a ground voltage VSS terminal. If the pull-up signal PU is enabled, the driver 1223 may pull up a voltage level of a node ND11 corresponding to drain terminals of the PMOS transistor P11 and the NMOS transistor N11 to output a drive signal DRV through the node ND11. Alternatively, the driver 1223 may pull down a voltage level of the node ND11 to output the drive signal DRV through the node ND11 while the pulse of the pull-down signal PD occurs.

That is, the driver 1223 may pull up the node ND11 to generate the drive signal DRV having the power supply voltage VDD if the pull-up signal PU is enabled and may pull down the node ND11 to generate the drive signal DRV having the ground voltage VSS if the pull-down signal PD is enabled.

The latch unit 1224 may include a pair of cross-coupled inverters IV13 and IV14. The latch unit 1224 may inversely buffer and latch the drive signal DRV to output the inversely buffered and latched drive signal as the selection signal SEL.

Figure 3:
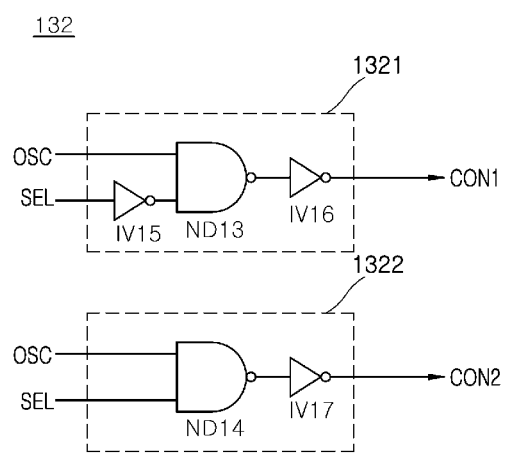
FIG. 3 is a logic circuit diagram illustrating an example of a representation of a signal transmitter included in a control signal generator of the internal voltage generation circuit illustrated in FIG. 1.

Referring to FIG. 3, the signal transmitter 132 may include a first transmitter 1321 and a second transmitter 1322.

The first transmitter 1321 may include an inverter IV15, a NAND gate ND13 and an inverter IV16. If the selection signal SEL is disabled to have a logic "low" level, the first transmitter 1321 may output the oscillation signal OSC as the first control signal CON1.

The second transmitter 1322 may include a NAND gate ND14 and an inverter IV17. The NAND gate ND14 and the inverter IV17 may be cascaded. If the selection signal SEL is enabled to have a logic "high" level, the second transmitter 1322 may output the oscillation signal OSC as the second control signal CON2.

An operation of the internal voltage generation circuit including the aforementioned configuration will be described hereinafter with reference to FIGS. 4 and 5 in conjunction with an example in which a level of the power supply voltage VDD is low (e.g., equal to or lower than 1.5 volts) and an example in which a level of the power supply voltage VDD is high (e.g., equal to or higher than 1.6 volts). In either example, it may be assumed that the predetermined period is set to correspond to a period for which the internal voltage signal VINT is pumped five times from a point of time that the enablement signal EN is generated.

Figure 4:
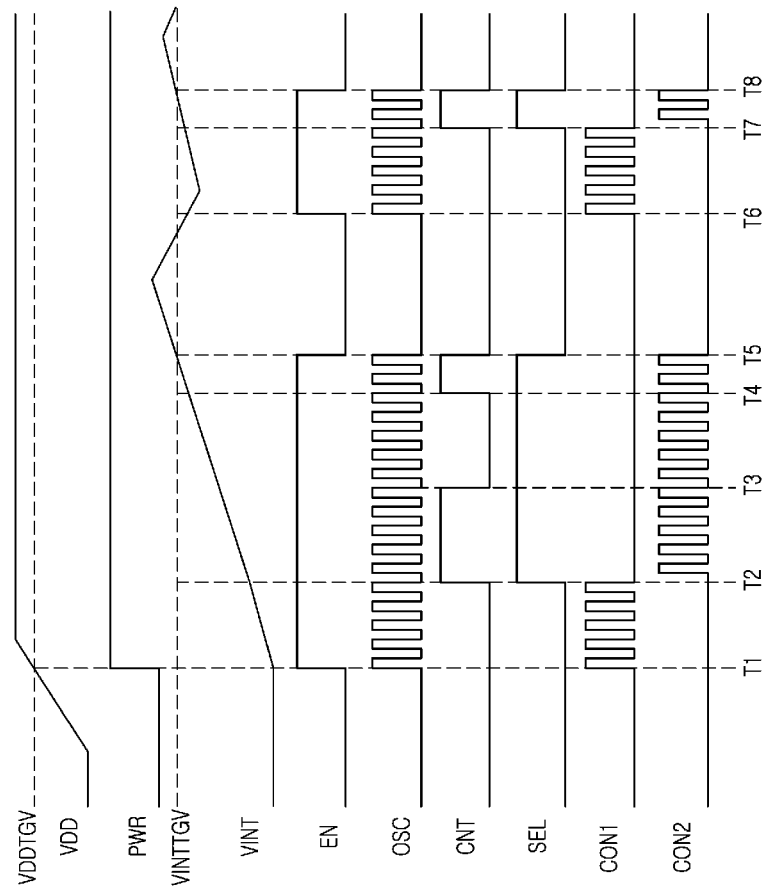
FIGS. 4 and 5 are timing diagrams illustrating an example of a representation of operations of an internal voltage generation circuit according to an embodiment.

FIG. 4 illustrates an example in which a level of the power supply voltage VDD is low (e.g., equal to or lower than 1.5 volts).

Referring to FIG. 4, the power-up signal PWR may be enabled to have a logic "high" level at a point of time "T1" that the power-up period terminates. As described above, the power-up period may correspond to a time period it takes the power supply voltage VDD to reach a power target voltage VDDTGV after the power supply voltage VDD starts to increase from a ground voltage with a constant slope.

At the point of time "T1", the voltage sensor 11 may sense a level of the internal voltage signal VINT to generate the enablement signal EN. The enablement signal EN may be enabled to have a logic "high" level because a level of the internal voltage signal VINT is lower than an internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive the pulses of the oscillation signal OSC and the enablement signal EN having a logic "high" level to generate the count signal CNT having a logic "low" level. The counter 121 may generate the count signal CNT having a logic "low" level because a first one of the pulses of the oscillation signal OSC is inputted thereto at the point of time "T1".

The selection signal generator 122 of the pulse detector 12 may receive the enablement signal EN having a logic "high" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may receive the pulses of the first control signal CON1 to pump the internal voltage signal VINT with the first drivability. In such an example, the second pump 22 may not be driven in response to the second control signal CON2 having a logic "low" level.

Next, at a point of time "T2", the voltage sensor 11 may sense a level of the internal voltage signal VINT to generate the enablement signal EN. The enablement signal EN may be enabled to have a logic "high" level because a level of the internal voltage signal VINT is still lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive a fifth pulse of the oscillation signal OSC and the enablement signal EN having a logic "high" level to generate the count signal CNT having a logic "high" level.

The selection signal generator 122 of the pulse detector 12 may receive the enablement signal EN having a logic "high" level and the count signal CNT having a logic "high" level to generate the selection signal SEL having a logic "high" level.

The signal transmitter 132 of the control signal generator 13 may receive the selection signal SEL having a logic "high" level to output the oscillation signal OSC as the second control signal CON2.

The second pump 22 of the internal voltage generator 2 may receive the pulses of the first control signal CON2 to pump the internal voltage signal VINT with the second drivability. In such an example, the first pump 21 may not be driven in response to the first control signal CON1 having a logic "low" level.

Next, at a point of time "T3", the counter 121 of the pulse detector 12 may receive a tenth pulse of the oscillation signal OSC and the enablement signal EN having a logic "high" level to generate the count signal CNT having a logic "low" level.

Next, at a point of time "T4", the voltage sensor 11 may sense a level of the internal voltage signal VINT to generate the enablement signal EN, The enablement signal EN may be enabled to have a logic "high" level because a level of the internal voltage signal VINT is still lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive a fifteenth pulse of the oscillation signal OSC and the enablement signal EN having a logic "high" level to generate the count signal CNT having a logic "high" level.

The selection signal generator 122 of the pulse detector 12 may receive the enablement signal EN having a logic "high" level and the count signal CNT having a logic "high" level to generate the selection signal SEL having a logic "high" level.

The signal transmitter 132 of the control signal generator 13 may receive the selection signal SEL having a logic "high" level to output the oscillation signal OSC as the second control signal CON2.

The second pump 22 of the internal voltage generator 2 may receive the pulses of the second control signal CON2 to pump the internal voltage signal VINT with the second drivability. In such an example, the first pump 21 may not be driven in response to the first control signal CON1 having a logic "low" level.

Next, at a point of time "T5", the voltage sensor 11 may sense a level of the internal voltage signal VINT to generate the enablement signal EN. The enablement signal EN may be disabled to have a logic "low" level because a level of the internal voltage signal VINT reaches the internal target voltage VINTTGV.

The oscillator 131 of the control signal generator 13 may receive the enablement signal EN having a logic "low" level to generate the oscillation signal OSC having a logic "low" level.

The counter 121 of the pulse detector 12 may receive the oscillation signal OSC having a logic "low" level and the enablement signal EN having a logic "low" level to generate the count signal CNT having a logic "low" level.

The selection signal generator 122 of the pulse detector 12 may receive the enablement signal EN having a logic "low" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may not be driven in response to the first control signal CON1 having a logic "low" level. In such an example, the second pump 22 may not be driven in response to the second control signal CON2 having a logic "low" level.

Next, at a point of time "T6", the voltage sensor 11 may sense a level of the internal voltage signal VINT to generate the enablement signal EN. The enablement signal EN may be enabled to have a logic "high" level because a level of the internal voltage signal VINT is lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive the pulses of the oscillation signal OSC and the enablement signal EN having a logic "high" level to generate the count signal CNT having a logic "low" level. The counter 121 may generate the count signal CNT having a logic "low" level because a first one of the pulses of the oscillation signal OSC is inputted thereto at the point of time "T6".

The selection signal generator 122 of the pulse detector 12 may receive the enablement signal EN having a logic "high" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may receive the pulses of the first control signal CON1 to pump the internal voltage signal VINT with the first drivability. In such an example, the second pump 22 may not be driven in response to the second control signal CON2 having a logic "low" level.

Next, at a point of time "T7", the voltage sensor 11 may sense a level of the internal voltage signal VINT to generate the enablement signal EN. The enablement signal EN may be enabled to have a logic "high" level because a level of the internal voltage signal VINT is still lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive a fifth pulse of the oscillation signal OSC and the enablement signal EN having a logic "high" level to generate the count signal CNT having a logic "high" level.

The selection signal generator 122 of the pulse detector 12 may receive the enablement signal EN having a logic "high" level and the count signal CNT having a logic "high" level to generate the selection signal SEL having a logic "high" level.

The signal transmitter 132 of the control signal generator 13 may receive the selection signal SEL having a logic "high" level to output the oscillation signal OSC as the second control signal CON2.

The second pump 22 of the internal voltage generator 2 may receive the pulses of the second control signal CON2 to pump the internal voltage signal VINT with the second drivability. In such an example, the first pump 21 may not be driven in response to the first control signal CON1 having a logic "low" level.

Next, at a point of time "T8", the voltage sensor 11 may sense a level of the internal voltage signal VINT to generate the enablement signal EN. The enablement signal EN may be disabled to have a logic "low" level because a level of the internal voltage signal VINT reaches the internal target voltage VINTTGV.

The oscillator 131 of the control signal generator 13 may receive the enablement signal EN having a logic "low" level to generate the oscillation signal OSC having a logic "low" level.

The counter 121 of the pulse detector 12 may receive the oscillation signal OSC having a logic "low" level and the enablement signal EN having a logic "low" level to generate the count signal CNT having a logic "low" level.

The selection signal generator 122 of the pulse detector 12 may receive the enablement signal EN having a logic "low" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may not be driven in response to the first control signal CON1 having a logic "low" level. In such an example, the second pump 22 may not be driven in response to the second control signal CON2 having a logic "low" level.

Figure 5:
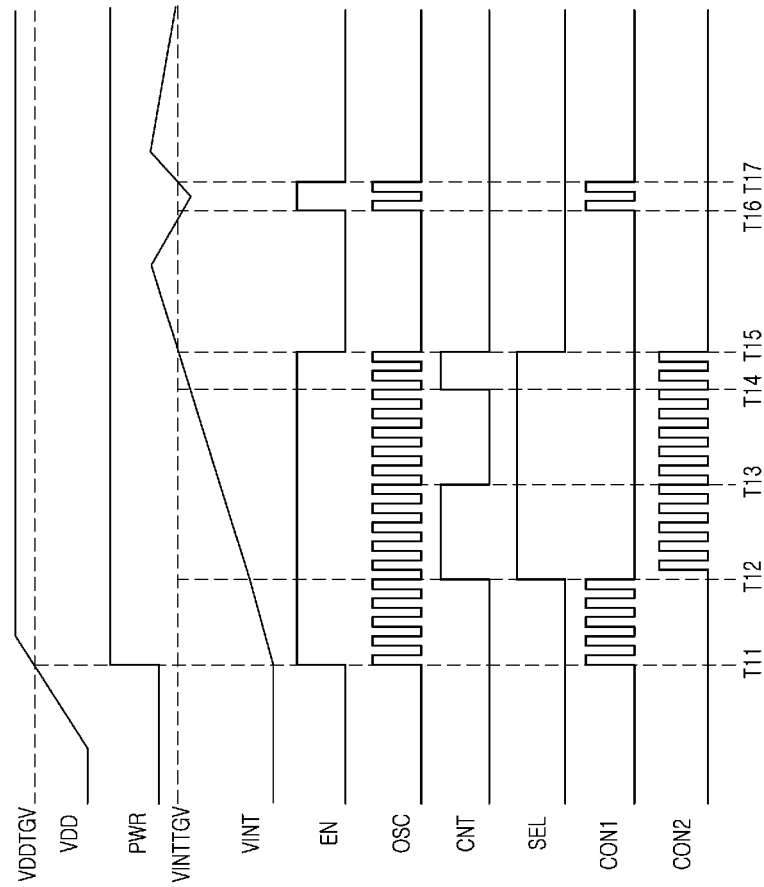

FIG. 5 illustrates an example in which a level of the power supply voltage VDD is high (e.g., equal to or higher than 1.6 volts).

Referring to FIG. 5, the power-up signal PWR may be enabled to have a logic "high" level at a point of time "T11" that the power-up period terminates. As described above, the power-up period may correspond to a time period it takes the power supply voltage VDD to reach a power target voltage VDDTGV after the power supply voltage VDD starts to increase from a ground voltage with a constant slope.

At the point of time "T11", the voltage sensor 11 may sense a level of the internal voltage signal VINT to generate the enablement signal EN. The enablement signal EN may be enabled to have a logic "high" level because a level of the internal voltage signal VINT is lower than an internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive the pulses of the oscillation signal OSC and the enablement signal EN having a logic "high" level to generate the count signal CNT having a logic "low" level. The counter 121 may generate the count signal CNT having a logic "low" level because a first one of the pulses of the oscillation signal OSC is inputted thereto at the point of time "T11".

The selection signal generator 122 of the pulse detector 12 may receive the enablement signal EN having a logic "high" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may receive the pulses of the first control signal CON1 to pump the internal voltage signal VINT with the first drivability. In such an example, the second pump 22 may not be driven in response to the second control signal CON2 having a logic "low" level.

Next, at a point of time "T12", the voltage sensor 11 may sense a level of the internal voltage signal VINT to generate the enablement signal EN. The enablement signal EN may be enabled to have a logic "high" level because a level of the internal voltage signal VINT is still lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive a fifth pulse of the oscillation signal OSC and the enablement signal EN having a logic "high" level to generate the count signal CNT having a logic "high" level.

The selection signal generator 122 of the pulse detector 12 may receive the enablement signal EN having a logic "high" level and the count signal CNT having a logic "high" level to generate the selection signal SEL having a logic "high" level.

The signal transmitter 132 of the control signal generator 13 may receive the selection signal SEL having a logic "high" level to output the oscillation signal OSC as the second control signal CON2.

The second pump 22 of the internal voltage generator 2 may receive the pulses of the first control signal CON2 to pump the internal voltage signal VINT with the second drivability. In such an example, the first pump 21 may not be driven in response to the first control signal CON1 having a logic "low" level.

Next, at a point of time "T13", the counter 121 of the pulse detector 12 may receive a tenth pulse of the oscillation signal OSC and the enablement signal EN having a logic "high" level to generate the count signal CNT having a logic "low" level.

Next, at a point of time "T14", the voltage sensor 11 may sense a level of the internal voltage signal VINT to generate the enablement signal EN. The enablement signal EN may be enabled to have a logic "high" level because a level of the internal voltage signal VINT is still lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive a fifteenth pulse of the oscillation signal OSC and the enablement signal EN having a logic "high" level to generate the count signal CNT having a logic "high" level.

The selection signal generator 122 of the pulse detector 12 may receive the enablement signal EN having a logic "high" level and the count signal CNT having a logic "high" level to generate the selection signal SEL having a logic "high" level.

The signal transmitter 132 of the control signal generator 13 may receive the selection signal SEL having a logic "high" level to output the oscillation signal OSC as the second control signal CON2.

The second pump 22 of the internal voltage generator 2 may receive the pulses of the second control signal CON2 to pump the internal voltage signal VINT with the second drivability. In such an example, the first pump 21 may not be driven in response to the first control signal CON1 having a logic "low" level.

Next, at a point of time "T15", the voltage sensor 11 may sense a level of the internal voltage signal VINT to generate the enablement signal EN. The enablement signal EN may be disabled to have a logic "low" level because a level of the internal voltage signal VINT reaches the internal target voltage VINTTGV.

The oscillator 131 of the control signal generator 13 may receive the enablement signal EN having a logic "low" level to generate the oscillation signal OSC having a logic "low" level.

The counter 121 of the pulse detector 12 may receive the oscillation signal OSC having a logic "low" level and the enablement signal EN having a logic "low" level to generate the count signal CNT having a logic "low" level.

The selection signal generator 122 of the pulse detector 12 may receive the enablement signal EN having a logic "low" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may not be driven in response to the first control signal CON1 having a logic "low" level. In such an example, the second pump 22 may not be driven in response to the second control signal CON2 having a logic "low" level.

Next, at a point of time "T16", the voltage sensor 11 may sense a level of the internal voltage signal VINT to generate the enablement signal EN. The enablement signal EN may be enabled to have a logic "high" level because a level of the internal voltage signal VINT is lower than the internal target voltage VINTTGV.

The oscillator 131 of the control signal generator 13 may receive the enablement signal EN having a logic "high" level to generate the oscillation signal OSC including pulses that periodically occur.

The counter 121 of the pulse detector 12 may receive the pulses of the oscillation signal OSC and the enablement signal EN having a logic "high" level to generate the count signal CNT having a logic "low" level. The counter 121 may generate the count signal CNT having a logic "low" level because a first one of the pulses of the oscillation signal OSC is inputted thereto at the point of time "T16".

The selection signal generator 122 of the pulse detector 12 may receive the enablement signal EN having a logic "high" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may receive the pulses of the first control signal CON1 to pump the internal voltage signal VINT with the first drivability. In such an example, the second pump 22 may not be driven in response to the second control signal CON2 having a logic "low" level.

Next, at a point of time "T17", the voltage sensor 11 may sense a level of the internal voltage signal VINT to generate the enablement signal EN. The enablement signal EN may be disabled to have a logic "low" level because a level of the internal voltage signal VINT reaches the internal target voltage VINTTGV.

The oscillator 131 of the control signal generator 13 may receive the enablement signal EN having a logic "low" level to generate the oscillation signal OSC having a logic "low" level.

The counter 121 of the pulse detector 12 may receive the oscillation signal OSC having a logic "low" level and the enablement signal EN having a logic "low" level to generate the count signal CNT having a logic "low" level.

The selection signal generator 122 of the pulse detector 12 may receive the enablement signal EN having a logic "low" level and the count signal CNT having a logic "low" level to generate the selection signal SEL having a logic "low" level.

The signal transmitter 132 of the control signal generator 13 may receive the selection signal SEL having a logic "low" level to output the oscillation signal OSC as the first control signal CON1.

The first pump 21 of the internal voltage generator 2 may not be driven in response to the first control signal CON1 having a logic "low" level. In such an example, the second pump 22 may not be driven in response to the second control signal CON2 having a logic "low" level.

According to the above embodiments, an internal voltage generation circuit may pump an internal voltage signal using a pumping circuit having a relatively high drivability after a predetermined period if a level of the internal voltage signal pumped by a pumping circuit having a relatively low drivability is lower than an internal target voltage during the predetermined period. Thus, power consumption of the internal voltage generation circuit may be reduced.

Figure 6:
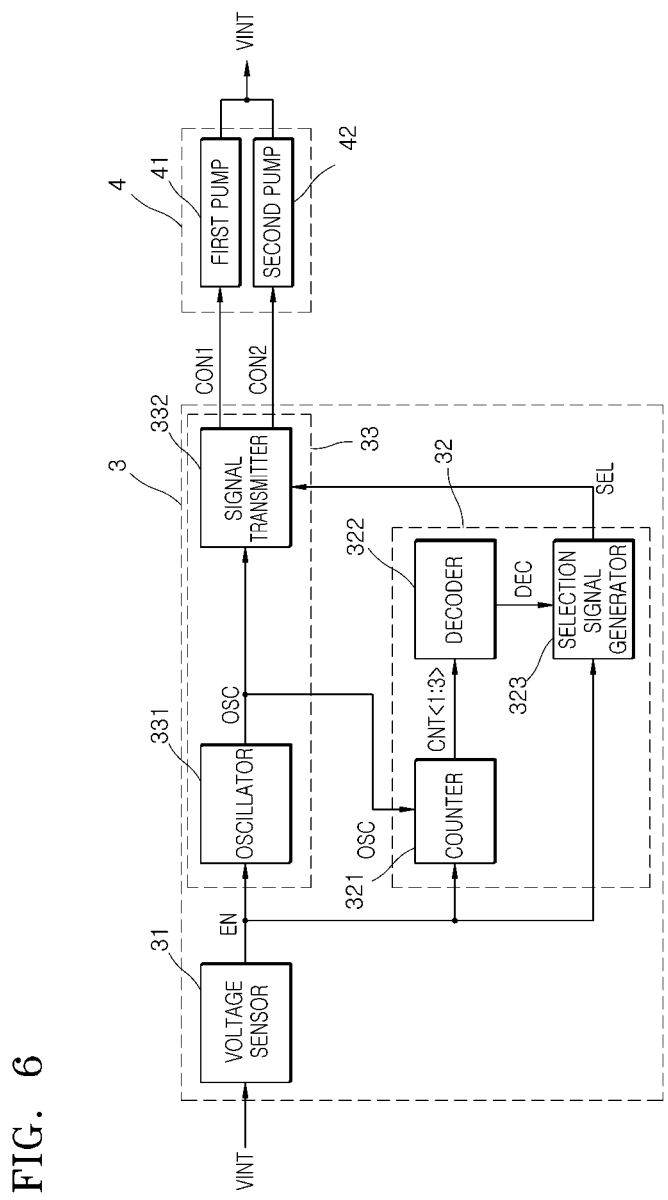
FIG. 6 is a block diagram illustrating an example of a representation of an internal voltage generation circuit according to an embodiment.

FIG. 6 is a block diagram illustrating an example of a representation of an internal voltage generation circuit according to an embodiment.

As illustrated in FIG. 6, the internal voltage generation circuit according to an embodiment may include a pump controller 3 and an internal voltage generator 4.

The pump controller 3 may be configured to include a voltage sensor 31, a pulse detector 32 and a control signal generator 33.

The voltage sensor 31 may sense a level of an internal voltage signal VINT to generate an enablement signal EN. The enablement signal EN may be enabled if a level of the internal voltage signal VINT is lower than a target voltage level. The enablement signal EN may be enabled if a level of the internal voltage signal VINT is lower than the target voltage level after a power-up period. The power-up period may correspond to a time period it takes a power supply voltage VDD to reach a predetermined voltage level (i.e., the target voltage level) after the power supply voltage VDD is applied to a semiconductor device.

The internal voltage signal VINT may be set to be a high voltage VPP having a voltage level higher than the power supply voltage VDD or a low voltage VBB having a voltage level lower than a ground voltage VSS according to the various embodiments.

The pulse detector 32 may include a counter 321, a decoder 322 and a selection signal generator 323.

The counter 321 may output first to third count signals CNT<1:3>. The first to third count signals CNT<1:3> may be sequentially counted in response to pulses of an oscillation signal OSC while the enablement signal EN is enabled. The counter 321 may be realized using any one of general counting circuits, and the number of bits of the count signals may be set to be different according to the various embodiments.

The decoder 322 may generate a decode signal DEC. The decode signal DEC may be enabled if a level combination of the first to third count signals CNT<1:3> is consistent with a predetermined level combination.

The selection signal generator 323 may generate a selection signal SEL. The selection signal SEL may be enabled if the decode signal DEC is enabled while the enablement signal EN is enabled. The selection signal generator 323 may have substantially the same configuration and function as the selection signal generator 122 illustrated in FIGS. 1 and 2. Thus, a detailed description of the selection signal generator 323 will be omitted hereinafter.

That is, the pulse detector 32 may generate the selection signal SEL. The selection signal SEL may be enabled if a level of the internal voltage signal VINT is lower than the target voltage level after a predetermined period elapses from a point of time that the enablement signal EN is generated.

The control signal generator 33 may include an oscillator 331 and a signal transmitter 332.

The oscillator 331 may generate the oscillation signal OSC including pulses that periodically occur while the enablement signal EN is enabled.

The signal transmitter 332 may output the oscillation signal OSC as a first control signal CON1 if the selection signal SEL is disabled and may output the oscillation signal OSC as a second control signal CON2 if the selection signal SEL is enabled. The signal transmitter 332 may have substantially the same configuration and function as the signal transmitter 132 illustrated in FIGS. 1 and 3. Thus, a detailed description of the signal transmitter 332 will be omitted hereinafter.

The control signal generator 33 may generate the oscillation signal OSC including pulses that periodically occur while the enablement signal EN is enabled and may output the oscillation signal OSC as the first or second control signal CON1 or CON2 according to a level of the selection signal SEL.

The pump controller 3 including the aforementioned configuration may generate the first control signal CON1 enabled if a level of the internal voltage signal VINT is lower than the target voltage level and may generate the second control signal CON2 enabled if a level of the internal voltage signal VINT is lower than the target voltage level even after a predetermined period elapses from a point of time that the internal voltage signal VINT is pumped. The predetermined period may be set by the number of pulses of the first control signal CON1 for pumping the internal voltage signal VINT.

The internal voltage generator 4 may include a first pump 41 and a second pump 42.

The first pump 41 may pump the internal voltage signal VINT with a first drivability if the pulses of the first control signal CON1 are inputted thereto.

The second pump 42 may pump the internal voltage signal VINT with a second drivability if the pulses of the second control signal CON2 are inputted thereto.

The second drivability may be set to be higher than the first drivability.

The internal voltage generator 4 including the aforementioned configuration may pump the internal voltage signal VINT with the first drivability if the first control signal CON1 is enabled and may pump the internal voltage signal VINT with the second drivability if the second control signal CON2 is enabled.

In various embodiments, the first pump 41 may be realized using, for example, a doubler pump that has the first drivability to generate the internal voltage signal VINT whose voltage level is twice a level of the power supply voltage VDD. The second pump 42 may be realized using, for example, a tripler pump that has the second drivability to generate the internal voltage signal VINT whose voltage level is three times a level of the power supply voltage VDD. The first drivability of the first pump 41 may be set to be different according to the various embodiments, and the second drivability of the second pump 42 may also be set to be different according to the various embodiments. According to the other embodiments illustrated in FIG. 6, an internal voltage generation circuit may pump an internal voltage signal using a pumping circuit having a relatively high drivability after a predetermined period if a level of the internal voltage signal pumped by a pumping circuit having a relatively low drivability is lower than an internal target voltage during the predetermined period. Thus, power consumption of the internal voltage generation circuit may be reduced.

Figure 7:
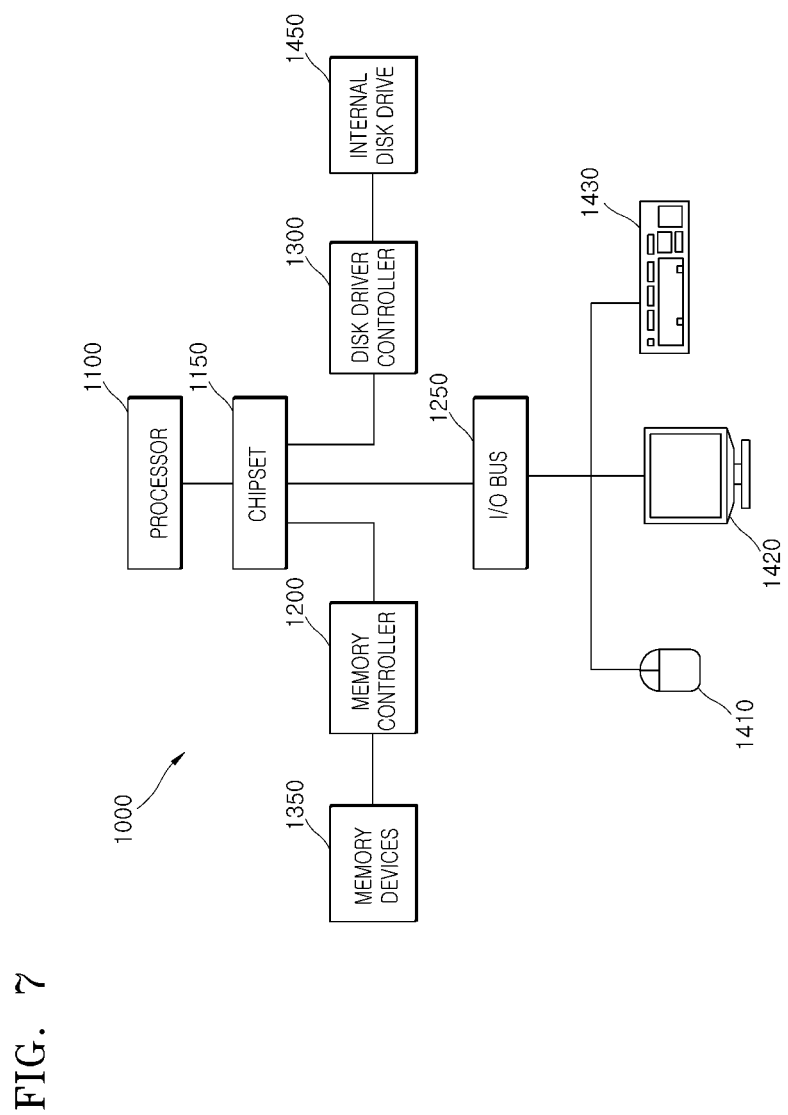
FIG. 7 illustrates a block diagram of an example of a representation of a system employing the internal voltage generation circuit in accordance with the embodiments discussed above with relation to FIGS. 1-6.

The internal voltage generation circuit discussed above (see FIGS. 1-6) are particular useful in the design of memory devices, processors, and computer systems. For example, referring to FIG. 7, a block diagram of a system employing the internal voltage generation circuit in accordance with the embodiments are illustrated and generally designated by a reference numeral 1000. The system 1000 may include one or more processors or central processing units ("CPUs") 1100. The CPU 1100 may be used individually or in combination with other CPUs. While the CPU 1100 will be referred to primarily in the singular, it will be understood by those skilled in the art that a system with any number of physical or logical CPUs may be implemented.

A chipset 1150 may be operably coupled to the CPU 1100. The chipset 1150 is a communication pathway for signals between the CPU 1100 and other components of the system 1000, which may include a memory controller 1200, an input/output ("I/O") bus 1250, and a disk drive controller 1300. Depending on the configuration of the system, any one of a number of different signals may be transmitted through the chipset 1150, and those skilled in the art will appreciate that the routing of the signals throughout the system 1000 can be readily adjusted without changing the underlying nature of the system.

As stated above, the memory controller 1200 may be operably coupled to the chipset 1150. The memory controller 1200 may include at least one internal voltage generation circuit as discussed above with reference to FIGS. 1-6. Thus, the memory controller 1200 can receive a request provided from the CPU 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one internal voltage generation circuit as discussed above with relation to FIGS. 1-6, the memory devices 1350 may include a plurality of word lines and a plurality of bit lines for defining a plurality of memory cells. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420, and 1430. Further, the I/O bus 1250 may be integrated into the chipset 1150.

The disk drive controller 1450 (i.e., internal disk drive) may also be operably coupled to the chipset 1150. The disk drive controller 1450 may serve as the communication pathway between the chipset 1150 and one or more internal disk drives 1450. The internal disk drive 1450 may facilitate disconnection of the external data storage devices by storing both instructions and data. The disk drive controller 1300 and the internal disk drives 1450 may communicate with each other or with the chipset 1150 using virtually any type of communication protocol, including all of those mentioned above with regard to the I/O bus 1250.

It is important to note that the system 1000 described above in relation to FIG. 7 is merely one example of a system employing the internal voltage generation circuit as discussed above with relation to FIGS. 1-6. In alternate embodiments, such as cellular phones or digital cameras, the components may differ from the embodiments illustrated in FIG. 7.

What is claimed is:

1. An internal voltage generation circuit comprising:
   a voltage sensor suitable for sensing a level of an internal voltage signal to generate an enablement signal which is enabled if a level of the internal voltage signal is lower than a target voltage level;
   a pulse detector suitable for generating a selection signal which is enabled if a level of the internal voltage signal is lower than the target voltage level after a predetermined period elapses from a point of time that the enablement signal is generated; and
   a control signal generator suitable for generating an oscillation signal including pulses that occur in response to the enablement signal and suitable for outputting the oscillation signal as a first or second control signal according to a level of the selection signal; and
   an internal voltage generator suitable for pumping the internal voltage signal with a first drivability in response to the first control signal and suitable for pumping the internal voltage signal with a second drivability in response to the second control signal.

2. The internal voltage generation circuit of claim 1, wherein the predetermined period is set by the number of pulses of the first control signal for pumping the internal voltage signal.

3. The internal voltage generation circuit of claim 1, wherein the second drivability is higher than the first drivability.

4. The internal voltage generation circuit of claim 1, wherein the enablement signal is enabled if a level of the internal voltage signal is lower than the target voltage level after a power-up period.

5. The internal voltage generation circuit of claim 4, wherein the power-up period is a time period taken for a power supply voltage to reach a predetermined voltage level after the power supply voltage is applied to the internal voltage generation circuit.

6. The internal voltage generation circuit of claim 1, wherein the selection signal is disabled if the enablement signal is disabled.

7. The internal voltage generation circuit of claim 1, wherein the pulse detector includes:
 a counter suitable for receiving the enablement signal to generate a count signal which is enabled if the pulses of the oscillation signal are generated by a predetermined number of times; and
 a selection signal generator suitable for generating the selection signal which is enabled if the count signal is enabled while the enablement signal is enabled.

8. The internal voltage generation circuit of claim 7, wherein the selection signal generator includes:
 a pull-up signal generator suitable for generating a pull-up signal which is enabled if at least one of the enablement signal and a power-up signal is disabled;
 a pull-down signal generator suitable for generating a pull-down signal including a pulse that occurs during a predetermined period from a point of time that the count signal is enabled;
 a driver including an output node electrically coupled to the pull-up signal generator and the pull-down signal generator and suitable for driving the output node in response to the pull-up signal and the pull-down signal to generate a drive signal; and
 a latch unit suitable for inversely buffering and latching the drive signal to generate the selection signal.

9. The internal voltage generation circuit of claim 1, wherein the control signal generator includes:
 an oscillator suitable for generating the oscillation signal including the pulses that periodically occur in response to the enablement signal; and
 a signal transmitter suitable for outputting the oscillation signal as the first control signal if the selection signal is disabled and suitable for outputting the oscillation signal as the second control signal if the selection signal is enabled.

10. The internal voltage generation circuit of claim 9, wherein the signal transmitter includes:
 a first transmitter suitable for outputting the oscillation signal as the first control signal if the selection signal is disabled; and
 a second transmitter for outputting the oscillation signal as the second control signal if the selection signal is enabled.

11. The internal voltage generation circuit of claim 1, wherein the pulse detector includes:
 a counter suitable for outputting a plurality of count signals that are counted in response to the pulses of the oscillation signal while the enablement signal is enabled;
 a decoder suitable for generating a decode signal which is enabled if a level combination of the plurality of count signals is consistent with a predetermined level combination; and
 a selection signal generator suitable for generating the selection signal which is enabled if the decode signal is enabled while the enablement signal is enabled.

12. The internal voltage generation circuit of claim 11, wherein the selection signal generator includes:
 a pull-up signal generator suitable for generating a pull-up signal which is enabled if at least one of the enablement signal and a power-up signal is disabled;
 a pull-down signal generator suitable for generating a pull-down signal including a pulse that occurs during a predetermined period from a point of time that the count signal is enabled;
 a driver including an output node electrically coupled to the pull-up signal generator and the pull-down signal generator and suitable for driving the output node in response to the pull-up signal and the pull-down signal to generate a drive signal; and
 a latch unit suitable for inversely buffering and latching the drive signal to generate the selection signal.

13. An internal voltage generation circuit comprising:
 a pulse detector suitable for generating a selection signal which is enabled if a level of an internal voltage signal is lower than a target voltage level after a predetermined period elapses from a point of time that an enablement signal is generated;
 a control signal generator suitable for generating an oscillation signal including pulses that occur in response to the enablement signal and suitable for outputting the oscillation signal as a first control signal or a second control signal according to a level of the selection signal;
 a first pump suitable for pumping the internal voltage signal with a first drivability in response to the first control signal; and
 a second pump suitable for pumping the internal voltage signal with a second drivability in response to the second control signal,
 wherein the enablement signal is enabled if a level of the internal voltage signal is lower than the target voltage level.

14. The internal voltage generation circuit of claim 13, wherein the predetermined period is set by the number of pulses of the first control signal for pumping the internal voltage signal.

15. The internal voltage generation circuit of claim 13, wherein the second drivability is higher than the first drivability.

16. The internal voltage generation circuit of claim 13, wherein the enablement signal is enabled if a level of the internal voltage signal is lower than the target voltage level after a power-up period.

17. The internal voltage generation circuit of claim 16, wherein the power-up period is a time period taken for a power supply voltage to reach a predetermined voltage level after the power supply voltage is applied to the internal voltage generation circuit.

18. The internal voltage generation circuit of claim 17, wherein the first pump is suitable for generating the internal voltage signal at a voltage level that is twice a level of the power supply voltage, and
 wherein the second pump is suitable for generating the internal voltage signal at a voltage level that is three times a level of the power supply voltage.

19. The internal voltage generation circuit of claim 13, wherein the first pump includes a doubler pump and the second pump includes a tripler pump.

20. The internal voltage generation circuit of claim 13, wherein the selection signal is disabled if the enablement signal is disabled.

21. The internal voltage generation circuit of claim 13, wherein the pulse detector includes:
- a counter suitable for receiving the enablement signal to generate a count signal which is enabled if the pulses of the oscillation signal are generated by a predetermined number of times; and
- a selection signal generator suitable for generating the selection signal which is enabled if the count signal is enabled while the enablement signal is enabled.

22. The internal voltage generation circuit of claim 21, wherein the selection signal generator includes:
- a pull-up signal generator suitable for generating a pull-up signal which is enabled if at least one of the enablement signal and a power-up signal is disabled;
- a pull-down signal generator suitable for generating a pull-down signal including a pulse that occurs during a predetermined period from a point of time that the count signal is enabled;
- a driver including an output node electrically coupled to the pull-up signal generator and the pull-down signal generator and suitable for driving the output node in response to the pull-up signal and the pull-down signal to generate a drive signal; and
- a latch unit suitable for inversely buffering and latching the drive signal to generate the selection signal.

23. The internal voltage generation circuit of claim 13, wherein the control signal generator includes:
- an oscillator suitable for generating the oscillation signal including the pulses that periodically occur in response to the enablement signal; and
- a signal transmitter suitable for outputting the oscillation signal as the first control signal if the selection signal is disabled and suitable for outputting the oscillation signal as the second control signal if the selection signal is enabled.

24. The internal voltage generation circuit of claim 23, wherein the signal transmitter includes:
- a first transmitter suitable for outputting the oscillation signal as the first control signal if the selection signal is disabled; and
- a second transmitter for outputting the oscillation signal as the second control signal if the selection signal is enabled.

25. The internal voltage generation circuit of claim 13, wherein the pulse detector includes:
- a counter suitable for outputting a plurality of count signals that are counted in response to the pulses of the oscillation signal while the enablement signal is enabled;
- a decoder suitable for generating a decode signal which is enabled if a level combination of the plurality of count signals is consistent with a predetermined level combination; and
- a selection signal generator suitable for generating the selection signal which is enabled if the decode signal is enabled while the enablement signal is enabled.

26. The internal voltage generation circuit of claim 25, wherein the selection signal generator includes:
- a pull-up signal generator suitable for generating a pull-up signal which is enabled if at least one of the enablement signal and a power-up signal is disabled;
- a pull-down signal generator suitable for generating a pull-down signal including a pulse that occurs during a predetermined period from a point of time that the count signal is enabled;
- a driver including an output node electrically coupled to the pull-up signal generator and the pull-down signal generator and suitable for driving the output node in response to the pull-up signal and the pull-down signal to generate a drive signal; and
- a latch unit suitable for inversely buffering and latching the drive signal to generate the selection signal.

* * * * *